United States Patent
Maeda et al.

(10) Patent No.: US 8,448,734 B2
(45) Date of Patent: May 28, 2013

(54) CANISTER MOUNTING STRUCTURE FOR MOTORCYCLE AND MOTORCYCLE

(75) Inventors: Tetsuaki Maeda, Wako (JP); Akira Komaki, Wako (JP); Akiko Ishikawa, Wako (JP); Kazuya Minowa, Wako (JP); Hiroshi Kitamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 794 days.

(21) Appl. No.: 12/566,618

(22) Filed: Sep. 24, 2009

(65) Prior Publication Data
US 2010/0078241 A1 Apr. 1, 2010

(30) Foreign Application Priority Data
Sep. 29, 2008 (JP) .................. 2008-251307

(51) Int. Cl.
*B60K 15/00* (2006.01)
*F02M 33/02* (2006.01)

(52) U.S. Cl.
USPC ..................... 180/69.4; 180/219; 123/519

(58) Field of Classification Search
USPC ............ 180/68.3, 68.4, 68.5, 69.4, 218, 219, 180/225; 224/413, 423; 123/518, 519, 520; 60/299
See application file for complete search history.

(56) References Cited

U.S. PATENT DOCUMENTS

| 8,118,128 B2* | 2/2012 | Shimura et al. | 180/219 |
| 8,141,672 B2* | 3/2012 | Kuramochi et al. | 180/69.4 |
| 2002/0121534 A1* | 9/2002 | Hanagan | 224/423 |
| 2002/0175543 A1* | 11/2002 | Nicosia et al. | 297/215.12 |
| 2007/0045023 A1* | 3/2007 | Okabe et al. | 180/218 |
| 2010/0243355 A1* | 9/2010 | Hosoya et al. | 180/69.4 |
| 2010/0243360 A1* | 9/2010 | Inaoka | 180/225 |

FOREIGN PATENT DOCUMENTS

| JP | 56-053974 | 5/1981 |
| JP | 04-353257 | 12/1992 |
| JP | 07-242188 | 9/1995 |
| JP | 2010047164 A * | 3/2010 |

OTHER PUBLICATIONS

Japanese Office Action for corresponding JP Application No. 2008-251307, Jan. 11, 2012.

* cited by examiner

*Primary Examiner* — J. Allen Shriver, II
*Assistant Examiner* — Bryan Evans
(74) *Attorney, Agent, or Firm* — Ditthavong Mori & Steiner, P.C.

(57) ABSTRACT

A canister mounting structure for a motorcycle includes an engagement member and a lock tab. The engagement member is provided to a canister. The lock tab protrudes from an upper surface of a rear fender supported by a rear portion of a vehicle body frame to cover a rear wheel. The lock tab is engaged with the engagement member so as to hold the canister on the rear fender.

15 Claims, 6 Drawing Sheets

CANISTER MOUNTING STRUCTURE FOR MOTORCYCLE AND MOTORCYCLE

CROSS-REFERENCE TO RELATED APPLICATIONS

The present application claims priority under 35 U.S.C. §119 to Japanese Patent Application No. 2008-251307, filed Sep. 29, 2008. The contents of this application are incorporated herein by reference in their entirety.

BACKGROUND OF THE INVENTION

1. Field of the Invention

The present invention relates a canister mounting structure for a motorcycle and a motorcycle.

2. Discussion of the Background

A known motorcycle as disclosed in Japanese Patent Laid-open No. Hei 4-353257 has a rear fender supported on a rear frame at a rear portion of a vehicle body frame and a canister fixedly disposed on the rear fender.

The arrangement disclosed in Japanese Patent Laid-open No. Hei 4-353257, however, has a bracket fixed to the rear frame and the canister mounted on the bracket so as to hang from the rear frame. This makes it difficult to mount the canister and there is a need for facilitating mounting of the canister.

SUMMARY OF THE INVENTION

According to one aspect of the present invention, a canister mounting structure for a motorcycle includes an engagement member and a lock tab. The engagement member is provided to a canister. The lock tab protrudes from an upper surface of a rear fender supported by a rear portion of a vehicle body frame to cover a rear wheel. The lock tab is engaged with the engagement member so as to hold the canister on the rear fender.

According to one aspect of the present invention, a motorcycle includes a vehicle body frame, a rear wheel, a rear fender, an engagement member, and a lock tab. The rear fender is supported by a rear portion of the vehicle body frame to cover the rear wheel. The engagement member is provided to a canister. The lock tab protrudes from an upper surface of the rear fender and is engaged with the engagement member so as to hold the canister on the rear fender.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
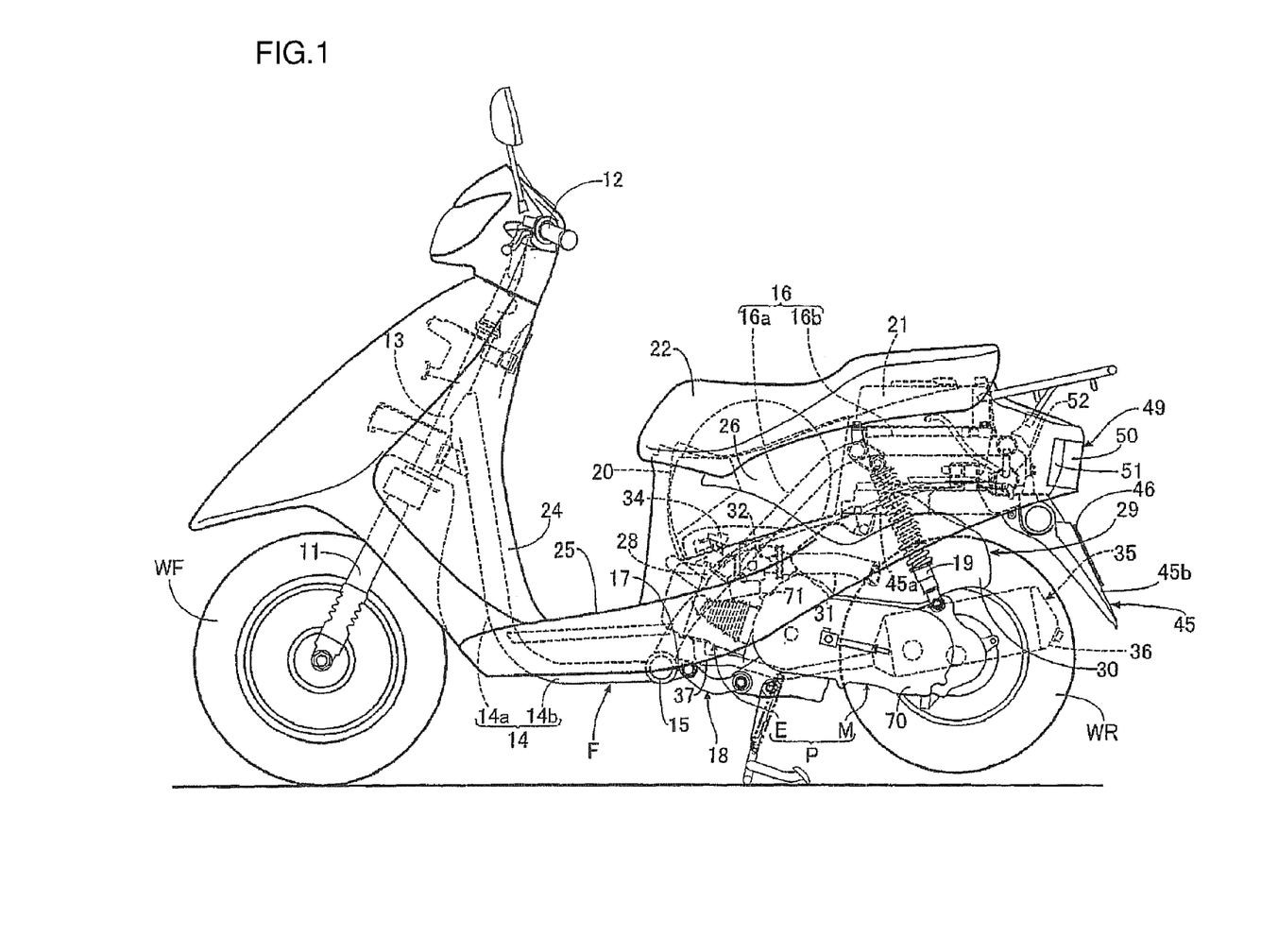
FIG. 1 is a left side elevational view showing a motorcycle according to an embodiment of the present invention.
Figure 2:
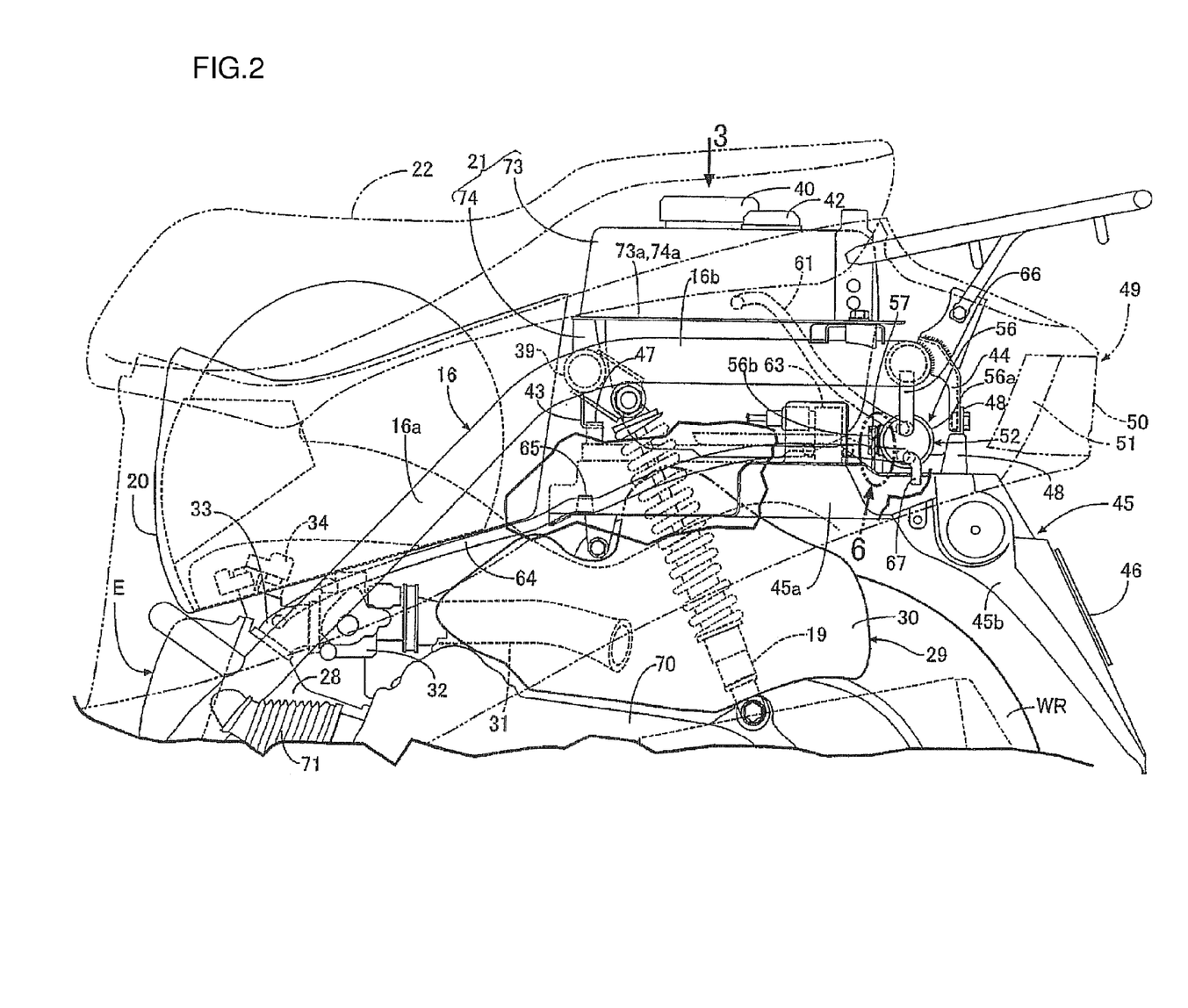
FIG. 2 is a partly cutaway side elevational view showing a rear portion of the motorcycle with an occupant seat and a vehicle body cover omitted, as viewed from the left side.
Figure 3:
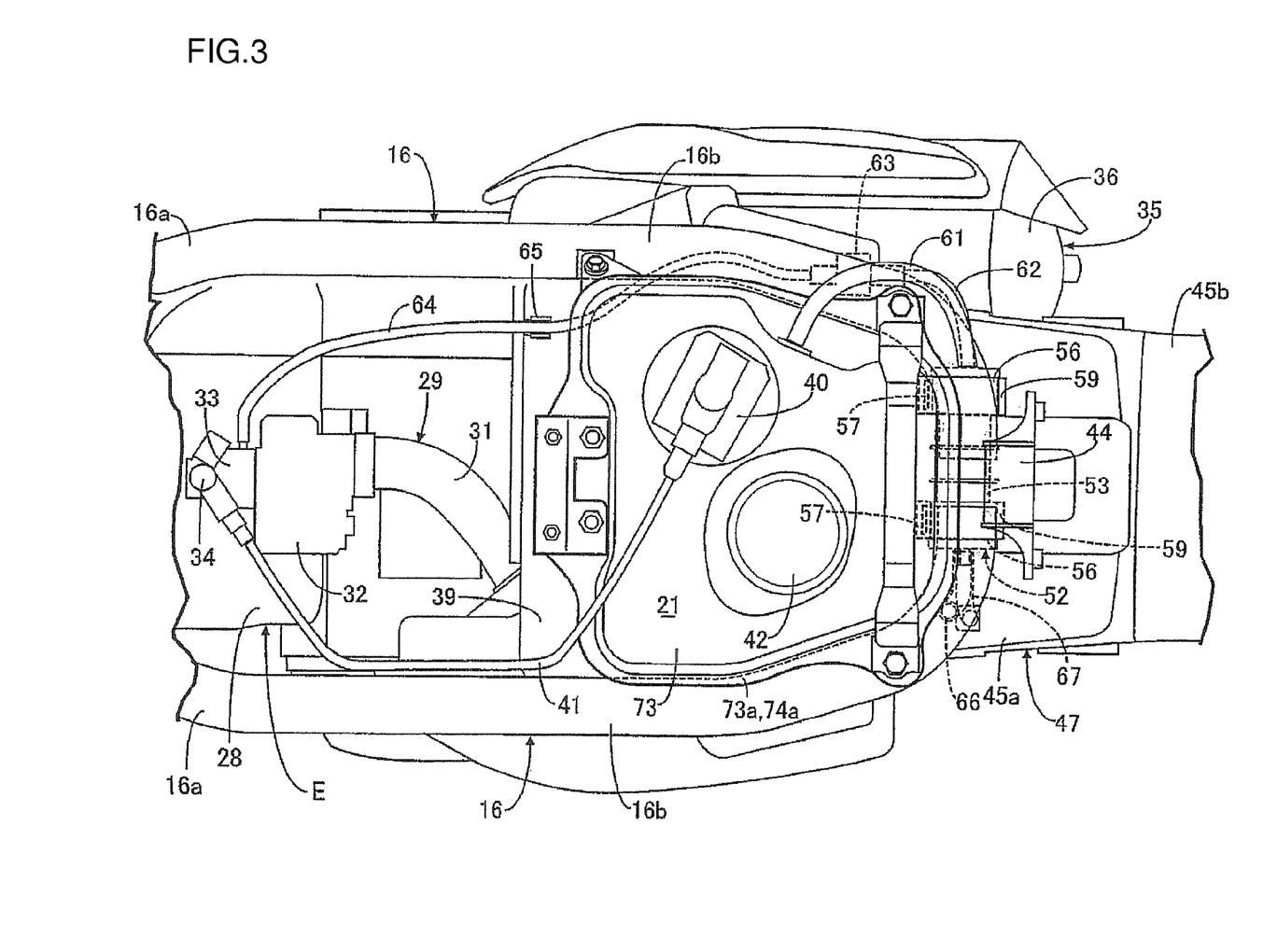
FIG. 3 is a plan view on arrow 3 of FIG. 2.
Figure 4:
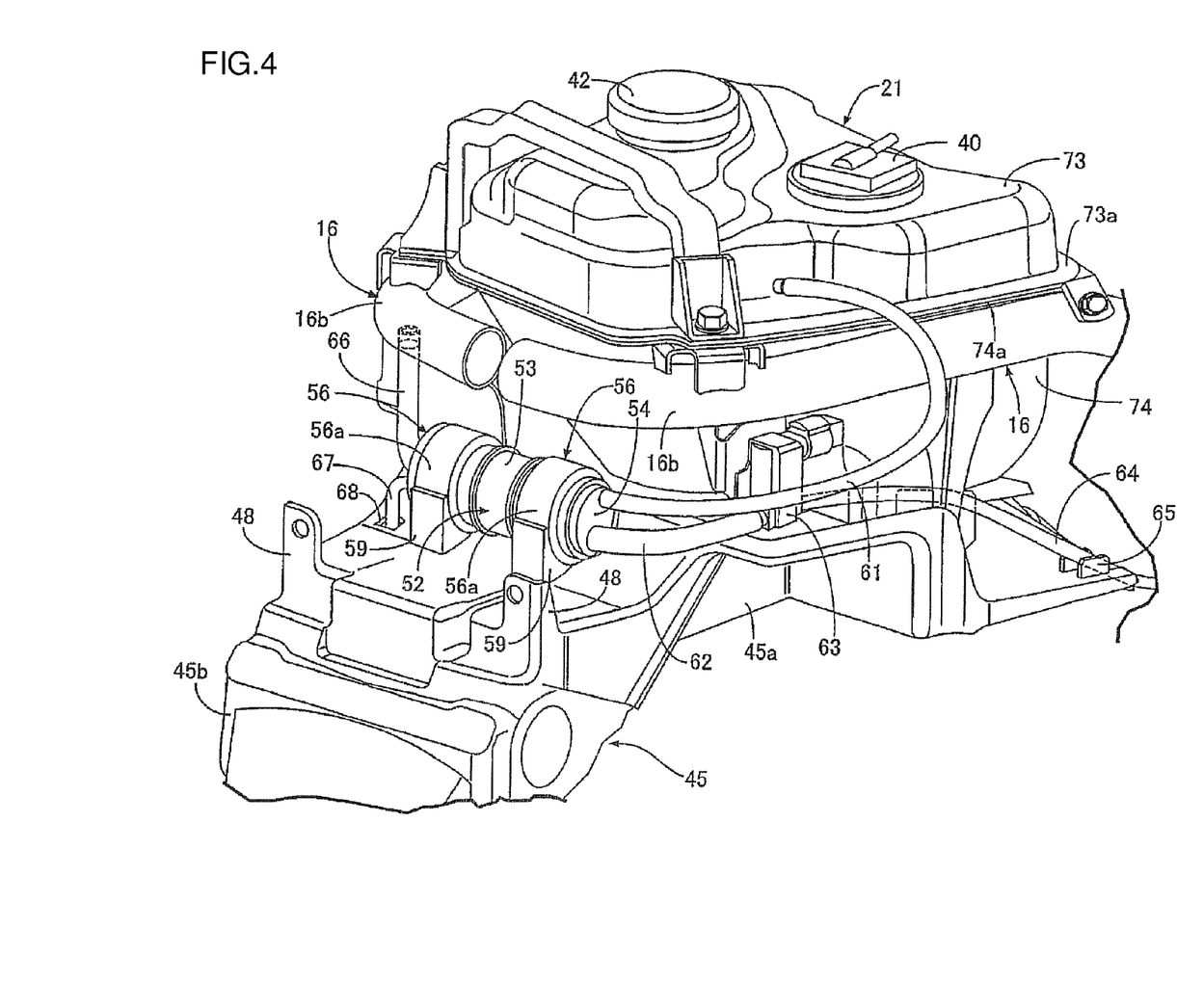
FIG. 4 is a perspective view showing parts around a fuel tank with the occupant seat, the vehicle body cover, and a rear stay omitted, as viewed from the right rearward direction.
Figure 5:
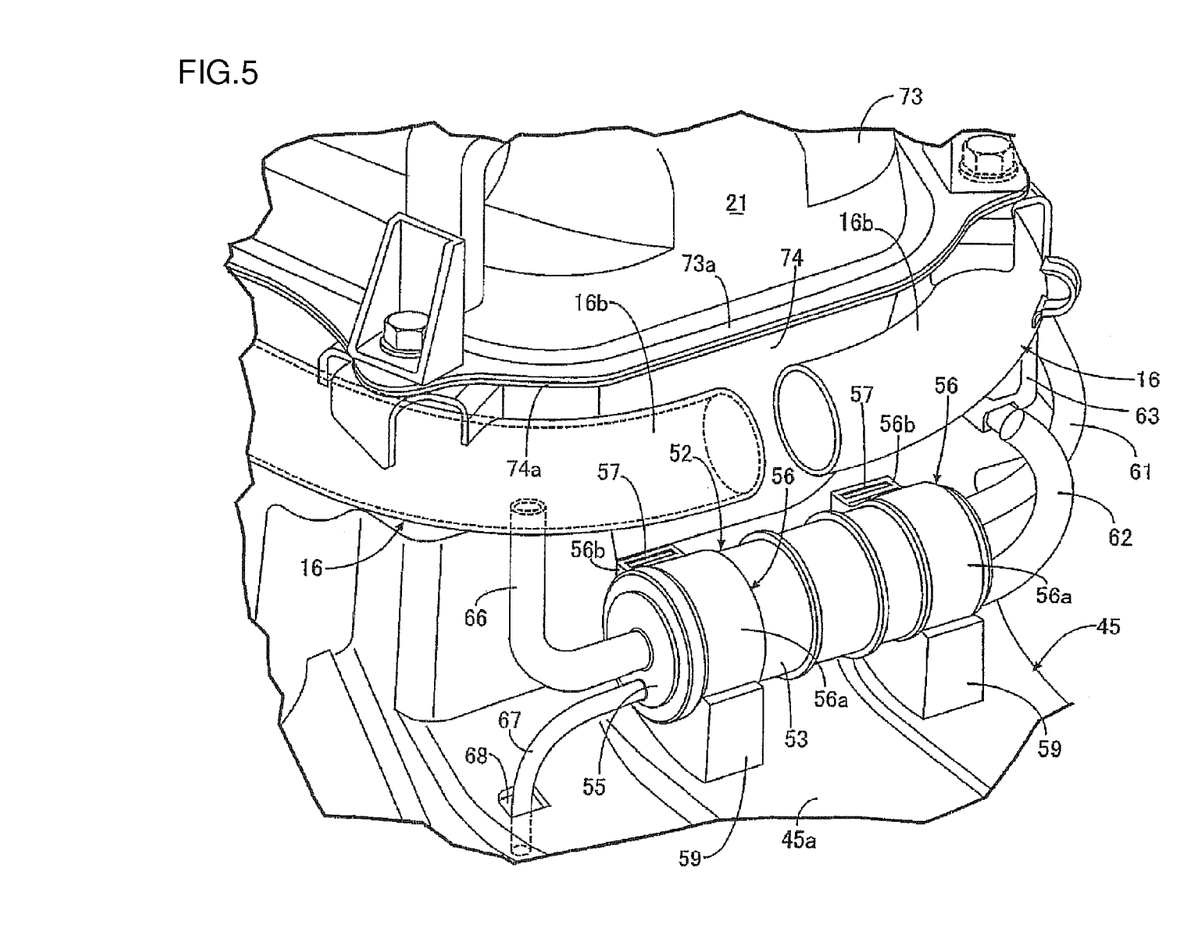
FIG. 5 is a perspective view showing parts around a canister with the occupant seat, the vehicle body cover, and the rear stay omitted, as viewed from the left rearward direction.
Figure 6:
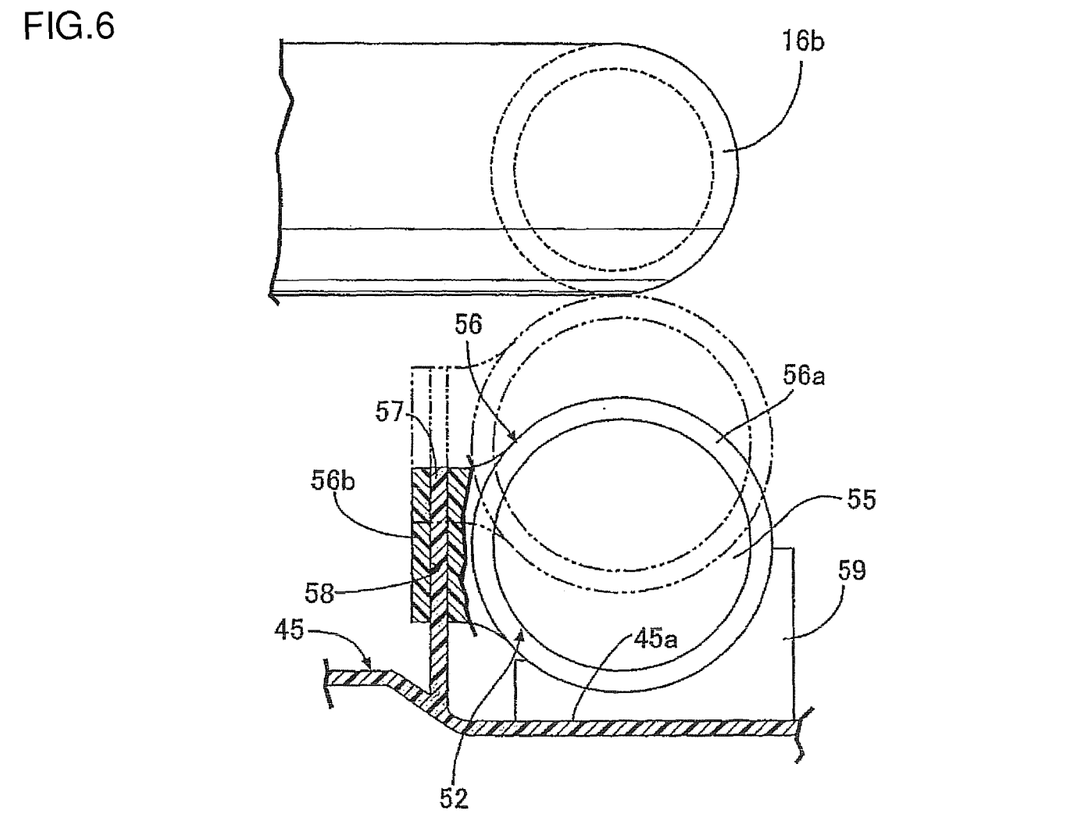
FIG. 6 is an enlarged view on arrow 6 of FIG. 2.

FIGS. 1 through 6 represent one embodiment of the present invention. FIG. 1 is a left side elevational view showing a motorcycle. FIG. 2 is a partly cutaway side elevational view showing a rear portion of the motorcycle with an occupant seat and a vehicle body cover omitted, as viewed from the left side. FIG. 3 is a plan view on arrow 3 of FIG. 2. FIG. 4 is a perspective view showing parts around a fuel tank with the occupant seat, the vehicle body cover, and a rear stay omitted, as viewed from the right rearward direction. FIG. 5 is a perspective view showing parts around a canister with the occupant seat, the vehicle body cover, and the rear stay omitted, as viewed from the left rearward direction. FIG. 6 is an enlarged view on arrow 6 of FIG. 2.

Referring first to FIG. 1, a vehicle body frame F of a scooter type motorcycle includes a head pipe 13, a main pipe 14, a lower cross pipe 15, and a pair of left and right rear frame pipes 16 . . . . More specifically, the head pipe 13 steerably supports a front fork 11 that journals a front wheel WF and a steering handlebar 12 connected to the front fork 11. The main pipe 14 integrates a first inclined portion 14a and a first horizontal portion 14b. The first inclined portion 14a extends downwardly toward the rear from the head pipe 13. The first horizontal portion 14b extends rearwardly from a lower end of the first inclined portion 14a. The lower cross pipe 15 is fixed to a rear end of the first horizontal portion 14b and extends crosswise to the left and right. Each of the rear frame pipes 16 integrates a second inclined portion 16a and a second horizontal portion 16b. The second inclined portion 16a has a front end integrally connected to a corresponding crosswise end of the lower cross pipe 15 and extends upwardly toward the rear. The second horizontal portion 16b extends rearwardly from an upper end of the second inclined portion 16a.

A bracket 17 . . . is disposed at the connection between each of the second inclined portions 16a . . . of the rear frame pipes 16 . . . and the lower cross pipe 15. A power unit P has a front portion supported vertically swingably on the brackets 17 . . . via a linkage mechanism 18. A rear wheel WR disposed on the right of a rear portion of power unit P is journaled on the rear portion of the power unit P. The power unit P is structured to include an internal combustion engine E and a continuously variable transmission M. Specifically, the internal combustion engine E is an OHC type 4-cycle engine having a forced air-cooled single cylinder disposed forwardly of the rear wheel WR. The transmission M is disposed between the internal combustion engine E and the rear wheel WR. In addition, a rear cushion unit 19 is disposed between a front portion of the second horizontal portion 16b in the left rear frame pipe 16 of the two rear frame pipes 16 . . . and the rear portion of the power unit P.

A storage box 20 that accommodates therein a helmet or other personal effects is disposed upwardly of the power unit P so as to be supported by the rear frame pipes 16 . . . . A fuel tank 21 is disposed rearwardly of the storage box 20 so as to be supported by the rear frame pipes 16 . . . .

The vehicle body frame F is covered in a vehicle body cover 23 made of a synthetic resin. The vehicle body cover 23 includes a leg shield 24, a step floor 25, and a pair of left and right side covers 26 . . . . Specifically, the leg shield 24 covers legs of a rider sitting on an occupant seat 22 from a forward direction. The step floor 25 is continuous with a lower portion of the leg shield 24 such that the rider can rest his or her feet thereon. The side covers 26 are continuous with the step floor 25 so as to cover the rear portion of the vehicle body from both sides. The tandem type occupant seat 22 that is hinge-supported by the storage box 20 is disposed above the side covers 26 so as to cover openably the storage box 20 and the fuel tank 21 from an upward direction.

Referring to FIGS. 2 and 3, an intake system 29 is connected to a side surface of an upper portion of a cylinder head 28 in the internal combustion engine E. The intake system 29 includes an air cleaner 30, a connecting tube 31, a throttle body 32, and an intake pipe 33. Specifically, the air cleaner 30 is disposed on the left side of the rear wheel WR. The connecting tube 31 has an upstream end connected to the air cleaner 30 and a downstream end connected to the throttle body 32. The intake pipe 33 connects between the throttle body 32 and the cylinder head 28. A fuel injection valve 34 is fitted as an adjunct to the intake pipe 33.

Referring again to FIG. 1, an exhaust system 35 is connected to a side surface at a lower portion of the cylinder head 28. The exhaust system 35 includes an exhaust muffler 36 and an exhaust pipe 37. Specifically, the exhaust muffler 36 is disposed on the right side of the rear wheel WR. The exhaust pipe 37 connects between the exhaust muffler 36 and the cylinder head 28.

An upper cross pipe 39 is disposed across front portions of the second horizontal portions 16b . . . in the rear from pipes 16 . . . in the rear portion of the vehicle body frame F. Referring to FIG. 4, each of the second horizontal portions 16b . . . has a rear portion bent inwardly in a vehicle width direction substantially at 90 degrees. A rear end of each of the second horizontal portions 16b . . . is open to face each other.

The fuel tank 21 includes an upper half body 73 and a lower half body 74. The upper half body 73 includes a flange portion 73a that is joined to a flange portion 74a of the lower half body 74 to form the fuel tank 21. Being arranged in this manner, the fuel tank 21 permits easy molding. Moreover, the fuel tank 21 is disposed in an area surrounded by the upper cross pipe 39 and the second horizontal portions 16b . . . of the rear frame pipes 16 . . . , so that the fuel tank 21 is supported by the upper cross pipe 39 and the second horizontal portions 16b . . . . A fuel supply hose 41 extended forwardly from the fuel tank 21 has a first end connected to a fuel pump 40 mounted at an upper portion of the fuel tank 21 and a second end connected to the fuel injection valve 34 that is fitted as an adjunct to the intake pipe 33 of the intake system 29. In addition, a fuel cap 42 is openably and closably mounted at the upper portion of the fuel tank 21 so as to be opened when fuel is to be poured in the fuel tank 21.

A front stay 43 (see FIG. 2) which is formed substantially into an L shape is fixed at an intermediate portion of the upper cross pipe 39 in the vehicle width direction. A rear stay 44 is fixed between rear portions of the second horizontal portions 16b . . . in the rear frame pipes 16 . . . so as not to close the opening in the rear end of each of the second horizontal portions 16b . . . .

The rear wheel WR is covered in a rear fender 45 from an upward direction. The rear fender 45 is formed from a synthetic resin to include integrally a support plate portion 45a and an inclined portion 45b. Specifically, the support plate portion 45a is disposed substantially horizontally between the fuel tank 21 and the rear wheel WR. The inclined portion 45b inclines downwardly toward the rear from a rear end of the support plate portion 45a and is mounted with a license plate 46. The rear fender 45 is supported by a rear portion of the vehicle body frame F. In accordance with the embodiment of the present invention, the support plate portion 45a of the rear fender 45 is supported by the front stay 43 and the rear stay 44. Specifically, a front portion of the support plate portion 45a integrally includes a front support portion 47 that allows a lower portion of the front stay 43 to be inserted thereinto from a forward direction. Further, a rear portion of the support plate portion 45a integrally includes a pair of rear support portions 48, 48 that are fastened to a lower portion of the rear stay 44.

A rear combination lamp 49 is provided in a connected row arrangement at a rear portion of the pair of left and right side covers 26 . . . that form part of the vehicle body cover 23. The rear combination lamp 49, a rear portion lighting apparatus, has a tail lamp 50 and a pair of left and right turn signal lamps 51 . . . .

Referring also to FIG. 5, a canister 52 is fixedly disposed on the support plate portion 45a of the rear fender 45 at a position forward of the rear stay 44 and rearward of the fuel tank 21. In a plan view, the canister 52 partly overlaps the flange portions 73a, 74a of the fuel tank 21. Further, the canister 52 is disposed downwardly of the rear portion of the second horizontal portions 16b . . . of the rear frame pipes 16 . . . in the vehicle body frame F so as to follow along a wall surface of the lower half body 74 in the fuel tank 21. Moreover, the canister 52 is covered in the side covers 26 . . . and the rear combination lamp 49 from both leftward and rightward, and rearward directions.

A case 53 of the canister 52 is formed into a cylinder, extending in the vehicle width direction and having both ends closed by end walls 54, 55. The case 53 of the canister 52 includes a pair of engagement members 56, 56. The engagement members 56 . . . engage a pair of lock tabs 57, 57 formed in a protruding condition on an upper surface of the support plate portion 45a in the rear fender 45. This results in the canister 52 being fixedly held in position on the rear fender 45.

Each of the engagement members 56 . . . is formed from rubber or other elastic material, integrating an annular portion 56a and an engagement protrusion 56b that protrudes outwardly from the annual portion 56a. The annular portion 56a is snapped resiliently over an outer periphery of the case 53 in the canister 52. The engagement protrusion 56b includes an engagement hole 58 through which the lock tab 57 is passed and with which the lock tab 57 is engaged as shown in FIG. 6.

The support plate portion 45a in the rear fender 45 further includes a pair of canister support portions 59, 59 that support the canister 52 from a downward direction. The canister support portions 59 are disposed at two places, each being spaced apart from each other, along an axis direction of the case 53. Each of the canister support portions 59 . . . has an upper surface that is formed into a downwardly concaved arc so as to abut against the annular portion 56a of the engagement member 56 from the downward direction.

The canister 52 is disposed downwardly of the rear portion of the second horizontal portions 16b . . . of the rear frame pipes 16 . . . in the vehicle body frame F as noted earlier. In this case, the spacing between the canister 52 mounted on the canister support portions 59 . . . and the rear portion of the second horizontal portions 16b . . . , specifically, the rear portion of the vehicle body frame F is set such that, when the engagement members 56 . . . are to slip upwardly out of the lock tabs 57 . . . as shown by a chain line in FIG. 6, the engagement members 56 . . . or the canister 52 abuts on the rear portion of the vehicle body frame F, specifically, the rear portion of the second horizontal portions 16b . . . before the engagement members 56 . . . slip out of the lock tabs 57 . . . .

A charge tube 61 for deriving fuel gas evaporated in the fuel tank 21 has a first end connected to the right side wall of the fuel tank 21 and a second end connected to the end wall 54 on the right of the two end walls 54, 55 of the case 53 in the canister 52. This allows the canister 52 to trap the fuel gas evaporated in the fuel tank 21.

In addition, a first purge tube 62 for drawing the fuel gas trapped by the canister 52 has a first end connected to the right end wall 54 and a second end connected to a purge control valve 63 fixedly disposed on the right of the fuel tank 21. The purge control valve 63 is closed when the internal combustion engine E is cold or during idle operation and is open when the internal combustion engine E is hot. A second purge tube 64 that has a first end connected to the purge control valve 63 is connected to the intake pipe 33 of the intake system 29. Accordingly, the fuel gas trapped by the canister 52 is drawn out of the canister 52 by vacuum in the intake system 29 when the internal combustion engine E is hot. The fuel gas is thereby supplied from the intake pipe 33 of the intake system 29 to the cylinder head 28 via the first purge tube 62, the purge control valve 63, and the second purge tube 64. In addition, the front portion of the support plate portion 45a in the rear fender 45 integrates a tube holder 65 formed thereon. The tube holder 65 serves as a holder for the second purge tube 64, an intermediate portion of which is fitted into the tube holder 65 from above.

An open-to-atmosphere tube 66 for opening the canister 52 to the atmosphere has a first end connected to, and a drain tube 67 for discharging drain from the canister 52 has a first end connected to, the left end wall 55 of the two end walls 54, 55 of the case 53 of the canister 52.

The open-to-atmosphere tube 66 is extended upwardly from the left end wall 55 of the canister 52 and has a second end inserted into a rear portion of the second horizontal portion 16b in the rear frame pipe 16 on the left side. Specifically, the open-to-atmosphere tube 66 is open to the atmosphere through the opening in the rear end of the second horizontal portion 16b by way of the second horizontal portion 16b in the rear frame pipe 16 on the left side.

The drain tube 67 is extended downwardly from the left end wall 55 of the canister 52 and has a second end inserted into a through hole 68 made in the rear portion of the support plate portion 45a in the rear fender 45. The second end of the drain tube 67 is open downwardly below the support plate portion 45a.

Referring again to FIGS. 1 and 2, a fan (not shown) that rotates in accordance with the operation of the internal combustion engine E is accommodated inside a transmission case 70 of the continuously variable transmission M in the power unit P. To introduce cooling air into the transmission case 70 using the fan, a bellows intake duct 71 has a first end connected to a front portion of the transmission case 70 and a second end connected to a lower portion of the second inclined portion 16a of the rear frame pipe 16 on the left side. Specifically, the cooling air is introduced into the transmission case 70 through the rear frame pipe 16 on the left side.

Effects of the embodiment of the present invention will be described below. The canister 52 is disposed on the support plate portion 45a of the rear fender 45 that is supported on the rear portion of the vehicle body frame F so as to cover the rear wheel WR from the above. The pair of engagement members 56, 56 provided for the canister 52 engages the lock tabs 57, 57 formed in a protruding condition on the upper surface of the support plate portion 45a in the rear fender 45. This results in the canister 52 being fixedly held in position on the rear fender 45.

Specifically, simply engaging the engagement members 56 . . . of the canister 52 with the lock tabs 57 . . . formed in a protruding condition on the rear fender 45 causes the canister 52 to be fixedly held in place on the rear fender 45, so that the canister 52 can be mounted on the rear fender 45 through a simple structure. Moreover, the arrangement facilitates mounting of the canister 52.

Each of the engagement members 56 . . . is formed from rubber, integrating the annular portion 56a that is snapped resiliently over the outer periphery of the case 53 in the canister 52 and the engagement protrusion 56b that protrudes outwardly from the annual portion 56a so as to engage the lock tab 57. These arrangements not only allow the canister 52 to be easily provided with the engagement member 56 by simply snapping the annular portion 56a resiliently over the outer periphery of the canister 52, but also make easy the engagement of the engagement protrusion 56b with the lock tab 57. In addition, oscillations from the lock tab 57 on the side of the rear fender 45 can be inhibited from being transmitted to the engagement member 56, specifically, the side of the canister 52.

Further, the support plate portion 45a in the rear fender 45 includes the canister support portions 59 . . . that abut on the engagement members 56 . . . from the downward direction to support the canister 52. The canister support portions 59 . . . thereby support the weight of the canister 52. This minimizes strength requirements of engagement portions between the engagement members 56 . . . and the lock tabs 57 . . . . In addition, the engagement members 56 . . . formed from rubber can inhibit oscillations from being transmitted from the rear fender 45 to the canister 52.

The canister 52 is disposed so as to overlap in part the flange portions 73a, 74a of the fuel tank 21 in a plan view and so as to follow along the wall surface of the lower half body 74 in the fuel tank 21. By disposing the canister 52 in close vicinity to the fuel tank 21, the charge tube 61 that connects between the fuel tank 21 and the canister 52 can be shortened.

The canister 52 is disposed at a position forward of the rear stay 44 disposed at the rear portion of the vehicle body frame F so as to support the rear fender 45, rearward of the fuel tank 21, and downward of the rear portion of the vehicle body frame F. The canister 52 fixedly disposed on the rear fender 45 is therefore covered in the fuel tank 21 and the rear stay 44 at the front and rear, respectively, and in the rear portion of the vehicle body frame F in the upward direction. The canister 52 can therefore be protected without needing any special protective member.

If the engagement members 56 . . . included in the canister 52 are to slip upwardly out of the lock tabs 57 . . . provided in a protruding condition on the rear fender 45, the engagement members 56 . . . or the canister 52 abuts on the rear portion of the vehicle body frame F before the engagement members 56 . . . slip out of the lock tabs 57 . . . . This eliminates the need for any special lock mechanism that would prevent the engagement members 56 . . . from slipping out of the lock tabs 57 . . . , so that the engagement of the engagement members 56 . . . with the lock tabs 57 . . . is maintained to hold the canister 52 in place reliably.

According to a first embodiment of the present invention, there is provided a canister mounting structure for a motorcycle having a rear fender supported by a rear portion of a vehicle body frame, the rear fender for covering a rear wheel from above, and a canister fixedly disposed upwardly of the rear fender. The mounting structure includes an engagement member disposed on the canister and a lock tab disposed in a protruding condition on an upper surface of the rear fender, the engagement member engaging the lock tab so as to hold the canister fixedly on the rear fender.

According to a second embodiment of the present invention, in addition to the arrangements according to the first embodiment of the present invention, the engagement member is formed from an elastic material to integrate an annular portion that is snapped resiliently over an outer periphery of the canister with an engagement protrusion that protrudes outwardly from the annular portion so as to engage the lock tab.

According to a third embodiment of the present invention, in addition to the arrangements according to the first or second embodiment of the present invention, the rear fender includes a canister support portion that abuts against the engagement member from a downward direction to support the canister.

According to a fourth embodiment of the present invention, in addition to the arrangements according to any one of the first to third embodiments of the present invention, a fuel tank that generates fuel gas to be trapped by the canister is formed by joining a flange portion of an upper half body and a flange portion of a lower half body; and the canister is disposed to follow along a wall surface of the lower half body so as to overlap partly the flange portions in a plan view.

According to a fifth embodiment of the present invention, in addition to the arrangements according to the fourth embodiment of the present invention, the rear fender is supported by a rear stay disposed at a rear portion of the vehicle body frame; and the canister is disposed at a position downward of the rear portion of the vehicle body frame, and rearward of the fuel tank that is supported by the rear portion of the vehicle body frame at a position forward of the rear stay, and forward of the rear stay.

According to a sixth embodiment of the present invention, in addition to the arrangements according to any one of the first to fifth embodiments of the present invention, the canister is disposed downwardly of the rear portion of the vehicle body frame such that, when the engagement member is to slip upwardly out of the lock tab, the engagement member or the canister abuts on the rear portion of the vehicle body frame.

Note that a side cover 26 according to an embodiment of the present invention corresponds to a cover member of the present invention and a rear combination lamp 49 according to the embodiment of the present invention corresponds to a rear lighting apparatus of the present invention.

According to the first embodiment of the present invention, the canister can be fixedly held in position on the rear fender by simply engaging the engagement member disposed on the canister with the lock tab disposed in a protruding condition on the upper surface of the rear fender. These arrangements allow the canister to be mounted on the rear fender through a simple structure and facilitate mounting of the canister.

According to the second embodiment of the present invention, the canister can be easily provided with the engagement member by snapping the annular portion of the engagement member formed from an elastic material resiliently over the outer periphery of the canister. Moreover, engagement of the engagement protrusion of the engagement member with the lock tab is also easy. Oscillations from the lock tab on the side of the rear fender can also be inhibited from being transmitted to the engagement member, specifically, the side of the canister.

According to the third embodiment of the present invention, the canister support portion included in the rear fender supports the weight of the canister. This minimizes strength requirements of the engagement portion between the engagement member and the lock tab. In addition, the engagement member, if formed from an elastic material, can inhibit oscillations from being transmitted from the rear fender to the canister.

According to the fourth embodiment of the present invention, the fuel tank is formed by joining the flange portion of the upper half body and the flange portion of the lower half body. This facilitates molding of the fuel tank. Moreover, the canister is disposed to follow along a wall surface of the lower half body so as to overlap partly the flange portions in a plan view. By disposing the canister in close vicinity to the fuel tank, a charge tube that connects between the fuel tank and the canister can be shortened.

According to the fifth embodiment of the present invention, the canister is disposed at a position rearward of the fuel tank that is disposed forwardly of the rear stay, and downward of the rear portion of the vehicle body frame and forward of the rear stay. The canister is therefore covered in the fuel tank and the rear stay at the front and rear, respectively, and in the rear portion of the vehicle body frame in the upward direction. The canister can therefore be protected without needing any special protective member.

According to the sixth embodiment of the present invention, the engagement member or the canister abuts on the rear portion of the vehicle body frame before the engagement member is to slip upwardly out of the lock tab. This eliminates the need for any special lock mechanism that would prevent the engagement member from slipping out of the lock tab, so that the engagement of the engagement member with the lock tab is maintained to hold the canister in place reliably.

While the present invention has been described with reference to a preferred embodiment, it should be understood that the present invention is not limited to the disclosed embodiment, but also encompasses those changes falling within the spirit and scope of the appended claims.

What is claimed as new and is desired to be secured by Letters Patent of the United States is:

1. A canister mounting structure for a motorcycle, comprising:
    an engagement member provided to a canister having a cylindrical shape; and
    a lock tab protruding from an upper surface of a rear fender supported by a rear portion of a vehicle body frame to cover a rear wheel, the lock tab being engaged with the engagement member so as to hold the canister above the rear fender,
    wherein the motorcycle further comprises a fuel tank which generates fuel gas to be trapped by the canister and which comprises an upper half body having an upper flange portion and a lower half body having a lower flange portion, the upper flange portion and the lower flange portion being joined to form the fuel tank, and
    wherein the canister is disposed adjacent to a wall surface of the lower half body so that a part of the upper and lower flange portions project above the canister.

2. The canister mounting structure for a motorcycle according to claim 1, wherein the engagement member comprises,
    an annular portion made of an elastic material and resiliently provided around an outer periphery of the canister; and
    an engagement protrusion made of an elastic material and integrally formed with the annular portion, the engagement protrusion protruding outwardly from the annular portion so that the lock tab is engaged with the engagement protrusion.

3. The canister mounting structure for a motorcycle according to claim 1, further comprising:
a canister support portion which is provided to the rear fender and via which the canister is held on the rear fender, the canister support portion contacting an underneath of the engagement member thereby supporting the canister.

4. The canister mounting structure for a motorcycle according to claim 1,
wherein the fuel tank is supported by the rear portion of the vehicle body frame,
wherein the rear fender is supported by a rear stay, the rear stay being disposed at the rear portion of the vehicle body frame, and
wherein the canister is disposed underneath the rear portion of the vehicle body frame, the canister being located rearward of the fuel tank and frontward of the rear stay.

5. The canister mounting structure for a motorcycle according to claim 1,
wherein the engagement member is slidably engaged with the lock tab substantially in a vertical direction, and
wherein the canister is disposed right below the rear portion of the vehicle body frame in manner that limits an upward movement of the canister and the engagement member due to a contact thereof against the rear portion of the vehicle body frame so as to prevent the engagement member from slipping upwardly out of the lock tab.

6. The canister mounting structure for a motorcycle according to claim 2, further comprising:
a canister support portion which is provided to the rear fender and via which the canister is held on the rear fender, the canister support portion contacting an underneath of the engagement member thereby supporting the canister.

7. The canister mounting structure for a motorcycle according to claim 2,
wherein the engagement member is slidably engaged with the lock tab substantially in a vertical direction, and
wherein the canister is disposed right below the rear portion of the vehicle body frame in manner that limits an upward movement of the canister and the engagement member due to a contact thereof against the rear portion of the vehicle body frame so as to prevent the engagement member from slipping upwardly out of the lock tab.

8. The canister mounting structure for a motorcycle according to claim 3,
wherein the engagement member is slidably engaged with the lock tab substantially in a vertical direction, and
wherein the canister is disposed right below the rear portion of the vehicle body frame in manner that limits an upward movement of the canister and the engagement member due to a contact thereof against the rear portion of the vehicle body frame so as to prevent the engagement member from slipping upwardly out of the lock tab.

9. The canister mounting structure for a motorcycle according to claim 4,
wherein the engagement member is slidably engaged with the lock tab substantially in a vertical direction, and
wherein the canister is disposed right below the rear portion of the vehicle body frame in manner that limits an upward movement of the canister and the engagement member due to a contact thereof against the rear portion of the vehicle body frame so as to prevent the engagement member from slipping upwardly out of the lock tab.

10. A motorcycle comprising:
a vehicle body frame;
a rear wheel;
a rear fender supported by a rear portion of the vehicle body frame to cover the rear wheel;
a canister having a cylindrical shape;
an engagement member provided to the canister; and
a lock tab protruding from an upper surface of the rear fender and engaged with the engagement member so as to hold the canister above the rear fender wherein the motorcycle further comprises a fuel tank which generates fuel gas to be trapped by the canister and which comprises an upper half body having an upper flange portion and a lower half body having a lower flange portion, the upper flange portion and the lower flange portion being joined to form the fuel tank, and
wherein the canister is disposed adjacent to a wall surface of the lower half body so that a part of the upper and lower flange portions project above the canister.

11. The motorcycle according to claim 10, wherein the engagement member comprises,
an annular portion made of an elastic material and resiliently provided around an outer periphery of the canister; and
an engagement protrusion made of an elastic material and integrally formed with the annular portion, the engagement protrusion protruding outwardly from the annular portion so that the lock tab is engaged with the engagement protrusion.

12. The motorcycle according to claim 10, further comprising:
a canister support portion which is provided to the rear fender and via which the canister is held on the rear fender, the canister support portion contacting an underneath of the engagement member thereby supporting the canister.

13. The motorcycle according to claim 10,
wherein the fuel tank is supported by the rear portion of the vehicle body frame,
wherein the rear fender is supported by a rear stay, the rear stay being disposed at the rear portion of the vehicle body frame, and
wherein the canister is disposed underneath the rear portion of the vehicle body frame, the canister being located rearward of the fuel tank and frontward of the rear stay.

14. The motorcycle according to claim 10, wherein the engagement member is slidably engaged with the lock tab substantially in a vertical direction, and
wherein the canister is disposed right below the rear portion of the vehicle body frame in manner that limits an upward movement of the canister and the engagement member due to a contact thereof against the rear portion of the vehicle body frame so as to prevent the engagement member from slipping upwardly out of the lock tab.

15. The canister mounting structure for a motorcycle according to claim 1, wherein the engagement member comprises an annular portion configured to extend around an outer periphery of the canister.

* * * * *